(12) United States Patent
Cochran et al.

(10) Patent No.: US 7,149,919 B2
(45) Date of Patent: Dec. 12, 2006

(54) DISASTER RECOVERY SYSTEM WITH CASCADED RESYNCHRONIZATION

(75) Inventors: Robert Alan Cochran, Roseville, CA (US); Matthias Popp, Roseville, CA (US); Marcel Duvekot, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 697 days.

(21) Appl. No.: 10/440,209

(22) Filed: May 15, 2003

(65) Prior Publication Data
US 2004/0230859 A1    Nov. 18, 2004

(51) Int. Cl.
*G06F 11/00* (2006.01)

(52) U.S. Cl. .................... 714/4; 714/5; 714/6
(58) Field of Classification Search ............. 714/4, 714/5, 6; 711/162
See application file for complete search history.

(56) References Cited

U.S. PATENT DOCUMENTS

| | | | |
|---|---|---|---|
| 5,673,382 A | 9/1997 | Cannon et al. |
| 5,742,792 A | 4/1998 | Yanai et al. |
| 5,790,397 A | 8/1998 | Bissett et al. |
| 5,889,395 A | 3/1999 | Ofek et al. |
| 5,896,523 A | 4/1999 | Bissett et al. |
| 5,901,327 A | 5/1999 | Ofek |
| 6,044,444 A | 3/2000 | Ofek |
| 6,052,797 A * | 4/2000 | Ofek et al. ............ 714/6 |
| 6,092,085 A | 7/2000 | Keene |
| 6,144,999 A | 11/2000 | Khalidi et al. |
| 6,163,856 A | 12/2000 | Dion et al. |
| 6,173,377 B1 | 1/2001 | Yanai et al. |
| 6,175,552 B1 | 1/2001 | Parry et al. |
| 6,202,071 B1 | 3/2001 | Keene |
| 6,205,565 B1 | 3/2001 | Bissett et al. |
| 6,226,651 B1 | 5/2001 | Masuda et al. |
| 6,266,784 B1 | 7/2001 | Hsiao et al. |
| 6,279,119 B1 | 8/2001 | Bissett et al. |
| 6,421,688 B1 | 7/2002 | Song |
| 6,473,869 B1 | 10/2002 | Bissett et al. |
| 6,496,941 B1 | 12/2002 | Segal et al. |
| 6,502,205 B1 | 12/2002 | Yanai et al. |
| 6,516,424 B1 | 2/2003 | Satomi et al. |
| 2003/0051111 A1* | 3/2003 | Nakano et al. ............ 711/162 |
| 2003/0126388 A1* | 7/2003 | Yamagami .................. 711/162 |

OTHER PUBLICATIONS

Null, Linda. The essentials of Computer Organization and Architecture. Copyright 2003. Jones and Bartlett Publishers. p. 303.*

Veritas, Data sheet Veritas Volume Replicator, Enterprise-Class Disaster REcovery for Mission-Critical Environments, Aug. 2002, http://eval.veritas.com/downloads/pro/vvr/vvr_datasheet_0802.pdf.

(Continued)

*Primary Examiner*—Robert Beausoliel
*Assistant Examiner*—Matthew Urick

(57) ABSTRACT

A disaster recovery system with sequenced cascaded resynchronization comprises a plurality of data centers and a distributed control system. The individual data centers comprise a communication interface, a data storage, and a controller. The distributed control system is distributed and executable in the controllers of the plurality of data centers, and is capable of coordinating operations via the communication interfaces of the plurality of data centers to resynchronize a plurality of communication links between data center pairs of the plurality of data centers. The communication links including at least one synchronous link and at least one asynchronous link.

35 Claims, 10 Drawing Sheets

OTHER PUBLICATIONS

Parallel Computers Technology Inc., World's First Realtime Database Replication/Disast r Prevention Midware, 2002, 2003, pp. 1-8, King of Prussia, PA, USA.

Consoli, Jack, Achieving Disaster Recovery Prepar dness in PPRC Environments, 1998 www.shar .org/proceedings/sh98/data/S1516.pdf.

Mikkelsen, Claus and Attanese, Tom, Addressing Federal Government Disaster Recovery Requirements with Hitachi Freedom Storage, Nov. 2002, Hitachi Data Systems, www.hds.com/pdf/fed_gov_wp_peri_128.pdf., pp. 1-18, USA.

Fujitsu, Disaster REcovery Guideline for Oracle Database, Nov. 22, 2001, Fujitsu, storage-system.fujitsu.com/global/partners/oracle/download/rec_guideline.pdf., pp. 1-21.

Batra, Raman and Hatfield, Tom, Koch Industries Inc., Implementing a Disaster Recovery Solution for PeopleSoft Applications, Pap r #508, 2001, www.dbatoolbox.com/WP2001/appsmisc/Disaster_recovery_For_peoplesoft.pdf., pp. 1-21.

Burger, Charlie, Disaster Recovery Using ESS Copy Services—XRC (Session 3041), 2001 www.share.org/proceedings/SH98/data/S3041.pdf., IBM Corporation.

Hewlett-Packard Company, One-Button Disaster Recovery, Jun. 2002, http://www.openview.hp.com/products/omniback/Documents/Product_HTML-154.asp.

Tivoli Storag Manager for AIX Administrator's Guide, May 2, 2003, http://www.uottawa.ca/servic s/ccs/docs/tsm/buide/anrag219.htm.

IBM, DFSMS SDM Copy Services, May 2, 2003, http://www.storage.ibm.com/software/sms/sdm/.

AA. El Haddi, V. Lee, J. Banks, P. Sustman, Using Distributed File Replication for Business Continuance and Content Distribution, Constant Data Inc., Feb. 2003, pp. 1-6.

DCVAST, Boot Disk Solutions, 1999-2002, http://www.dcvast.com/solutions/infrastructur _sun_storage.shtml.

* cited by examiner

DISASTER RECOVERY SYSTEM WITH CASCADED RESYNCHRONIZATION

BACKGROUND OF THE INVENTION

Maintenance of multiple copies of data is part of the security function in data processing operations in case data is unavailable, damaged, or lost. Institutional users of data processing systems commonly maintain quantities of highly important information and expend large amounts of time and money to protect data against unavailability resulting from disaster or catastrophe. One class of techniques for maintaining redundant data copies is termed mirroring, in which data processing system users maintain copies of valuable information on-site on a removable storage media or in a secondary mirrored storage site positioned locally or remotely. Remote mirroring off-site but within a metropolitan distance, for example up to about 200 kilometers, protects against local disasters including fire, power outages, or theft. Remote mirroring over geographic distances of hundreds of kilometers is useful for protecting against catastrophes such as earthquakes, tornados, hurricanes, floods, and the like. Many data processing systems employ multiple levels of redundancy to protect data, positioned at multiple geographic distances.

Data processing systems utilize remote copies using synchronous mirroring or asynchronous mirroring. Synchronous remote copies have advantages when response time is relatively unimportant, distances between copy storage are short, and data cannot be lost. Synchronous mirroring is generally selected as a best choice for rapid recovery. In contrast, asynchronous mirroring is used when the smallest possible performance impact is to be imposed on the primary site, speed is important, and mirrored data is to travel long distances. Asynchronous mirroring is often used for very large geographical scale operations.

Data processing systems that store multiple mirrored copies spread over a range of distances may use synchronous links for some sites, generally relatively nearby sites, within metropolitan distances, and asynchronous links for other sites. One risk of systems that combine synchronous and asynchronous mirroring is the possibility of corrupted or unusable data when suspended links are not restored in a proper order.

SUMMARY

According to some embodiments, a disaster recovery system with sequenced cascaded resynchronization comprises a plurality of data centers and a distributed control system. The individual data centers comprise a communication interface, a data storage, and a controller. The distributed control system is distributed and executable in the controllers of the plurality of data centers, and is capable of coordinating operations via the communication interfaces of the plurality of data centers to resynchronize a plurality of communication links between data center pairs of the plurality of data centers. The communication links including at least one synchronous link and at least one asynchronous link.

According to other embodiments, a disaster recovery system with sequenced cascaded resynchronization comprises at least three data centers in a configuration including a first data center, a second data center linked to the first data center by a communication link, and a third data center. The third data center is linked to the first data center and the second data center by communication links. Information is multicast at least from the first data center to the second and third data centers. The disaster recovery system also includes a distributed control system distributed and is executable in at least three data centers. The distributed control system is configured to respond to failure of the link between the first and second data centers by transferring a bitmap representing a differential copy of information from the first data center to the second data center via the third data center.

In accordance with further embodiments, a method is practiced for responding to failure of a link in a daisy-chained multiple-site disaster recovery configuration including a first data center, a second data center synchronously linked to the first data center, and a third data center asynchronously linked to the second data center, the third data center having an internal copy linkage. The method comprises distributing control operations among the first, second, and third data centers and coordinating control among the first, second, and third data centers. The method further comprises suspending the asynchronous linkage between the second and third data centers, disconnecting the internal copy linkage of the third data center when the asynchronous linkage is suspended, resynchronizing the synchronous linkage between the first and second data centers following disconnection of the internal copy linkage, and resynchronizing the asynchronous linkage between the second and third data centers following resynchronization of the synchronous linkage. The method further comprises reconnecting the internal copy linkage when the synchronous and asynchronous linkages are resynchronized.

According to additional embodiments, a method of sequenced cascaded resynchronization comprises communicating data and control information among at least three data centers, multicasting from a first data center to second and third data centers, and distributing control operations among the first, second, and third data centers. The method further comprises responding to failure of the link between the first and second data centers by transferring a differential copy of information from the second data center to the third data center, based on a differential bitmap copied from the first data center to the second data center via the third data center. The bitmap contains information relating to the unsent Logical Unit (LUN) tracks in an in-order side file previously used for asynchronous communications between the first and third data centers.

According to further additional embodiments, a disaster recovery system with sequenced cascaded resynchronization comprises at least four disk arrays in a configuration. The first disk array comprises remote mirror primary volume storage. The second disk array comprises a remote mirror secondary volume and local mirror primary volume storage linked to the remote mirror primary volume storage by a first communication link. The second disk array also comprises a local mirror secondary volume and remote mirror primary volume storage internally mirror linked to a remote mirror secondary volume and local mirror primary volume storage by a second communication link. The third disk array comprises a remote mirror secondary volume storage linked to the second disk array local mirror secondary volume and remote mirror primary volume storage by a third communication link. The fourth disk array is linked to the remote mirror secondary volume storage by a fourth communication link. The disaster recovery system further comprises a distributed control system distributed and executable in the at least four disk arrays. The distributed control system controls the communication links using Meta commands.

BRIEF DESCRIPTION OF THE DRAWINGS

Embodiments of the invention relating to both structure and method of operation, may best be understood by referring to the following description and accompanying drawings.

DETAILED DESCRIPTION

Figure 1:
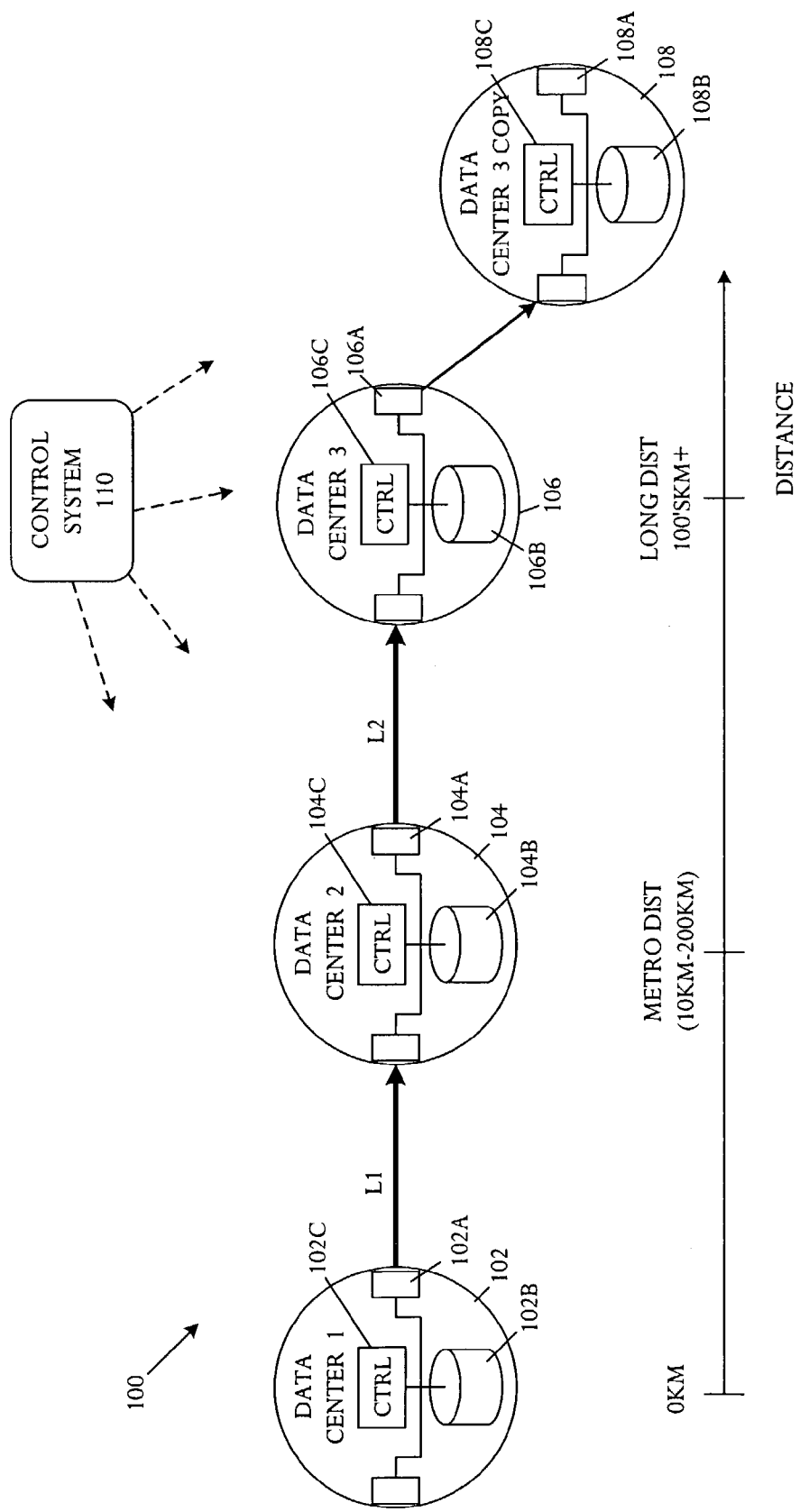
FIG. 1 is a schematic block diagram that illustrates an embodiment of a disaster recovery system capable of implementing a sequenced cascaded resynchronization operation.

Referring to FIG. 1, a schematic block diagram illustrates an embodiment of a disaster recovery system 100 capable of implementing a sequenced cascaded resynchronization operation. The disaster recovery system 100 comprises a plurality of data centers 102, 104, and 106, and a distributed control system 110. The individual data centers 102, 104, and 106 comprise a communication interface 102A, 104A, and 106A, data storage 102B, 104B, and 106B, and a controller 102C, 104C, and 106C. The distributed control system 110 is distributed and executable in the controllers 102C, 104C, and 106C of the plurality of data centers 102, 104, and 106 and coordinates operations via the communication interfaces 102A, 104A, and 106A to resynchronize communication links, for example links L1 and L2, between pairs of the data centers 102, 104, and 106. In the illustrative embodiment, the first communication link L1 that connects between the first data center 102 and the second data center 104 is a synchronous link and the second communication link L2 connecting between the second data center 104 and the third data center 106 is an asynchronous link.

Although any implementations are possible, the disaster recovery system 100 is commonly used in a configuration that the plurality of data centers includes data centers that are geographically removed. In the illustrative example, the synchronous link L1 extends a metropolitan distance of tens to hundreds of kilometers. Metropolitan distances from about 10 kilometers to 100 or 200 kilometers are common. The asynchronous link L2 is shown in a long distance implementation with distances of more than hundreds of kilometers.

In the illustrative embodiment, the third data center 106 also includes a redundant, safety-net internal copy 108 with data storage 108B and communication interface 108A, and generally also includes a controller 108C. The third data center internal copy 108 can be a mirrored storage device. In an illustrative embodiment, the third data center 106 includes a copy controller process, typically executable on the controller 106C and/or 108C that controls copying of data in the data storage 106B to the data storage 108B as a safety-net, redundant internal copy. In some embodiments, the copy controller functions as a data mirror to copy an exact replication of data from the data storage 106B to the data storage 108B.

In other embodiments and configurations, a safety-net copy may be implemented in a fourth data center that can be remote from the third data center 106.

The distributed control system 110 can be distributed and executable in the various controllers 102C, 104C, 106C, and 108C, or some or all parts of the distributed control system 110 can be distributed and executable in control elements outside the data centers 102, 104, and 106. A particular controller may not execute any part of the distributed control system 110, although distribution of executable processes throughout the data centers can facilitate efficient operation.

Any of the data centers can be highly scaleable so that an illustrative data center may actually include a group of data centers. Redundant data storage structures can easily and commonly be included within a data center.

The distributed control system 110 performs coordinated actions among the multiple data centers 102, 104, and 106, and within data centers 108 to manage the operations in a prescribed sequence, thereby preventing unusable or corrupted data. The distributed control processes of the distributed control system 110 can be disseminated over various communication paths including the synchronous L1 and asynchronous L2 paths and also via network communications, such as Local Area Network (LAN), Metropolitan Area Network (MAN), or Wide Area Network (WAN) communications. In some embodiments, executable code for the distributed control system 110 can be programmed into firmware such as disk array firmware. In other embodiments, the distributed control system 110 operations can be implemented from storage in memory, disk, tape, supplied by electronic signals over a network, including wireless dissemination, and the like.

The distributed control system 110 can be programmed using various techniques and technologies. For example, the distributed control system 110 can be implemented in the operating system of a host processor, for example using an Application Programming Interface (API). In other examples, the distributed control system 110 can be implemented using Meta commands, for example operating at a centralized location, or using a Command Line Interface (CLI). In some applications, a CLI implementation can be based within a Redundant Array of Independent Disk (RAID) manager.

In the illustrative embodiment, the synchronous disaster recovery link L1 feeds the asynchronous disaster recovery link L2 in a cascaded disaster recovery configuration. A control process executable in the distributed control system 110 can detect suspension of the synchronous disaster recovery link L1 and respond by suspending the asynchronous disaster recovery link L2 prior to resynchronizing the synchronous disaster recovery link L1. The operation of suspending a communications link involves postponing or canceling all accesses, including reads and writes, to the remotely mirrored volume to which a write has been performed until a particular event has been acknowledged. The distributed control system 110 coordinates the response so that the asynchronous link L2 is placed in the suspended state before the upstream synchronous link L1 enters an out-of-order copy, or resynchronization, state so that data at the downstream end of the asynchronous link L2 is not corrupted or unusable for purposes of disaster recovery in the event that the first two data centers 102 and 104 are lost.

Conventional systems that use manual resynchronization of the synchronous link are error prone, a high risk since a sequence or pair direction error or disaster that destroys the first two data centers, while the asynchronous link is in an out-of-order state, can leave unusable or corrupt data at the only remaining data center. Results can be catastrophic, for example a multi-million dollar disaster recovery plan of a Fortune 100 corporation could be rendered useless.

Figure 2:
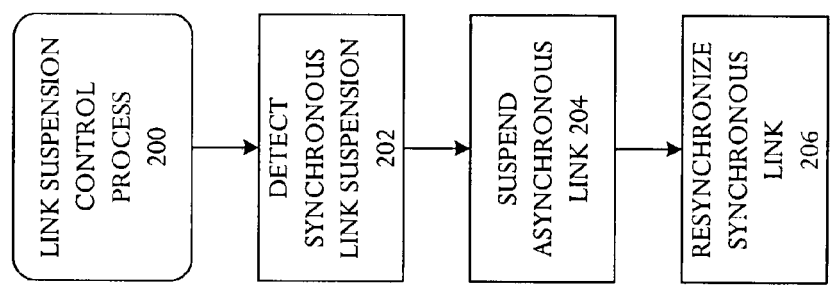
FIG. 2 is a flow chart showing a control process that responds to suspension of a synchronous disaster recovery link that feeds into an asynchronous link.

In various embodiments, the distributed control system 110 can execute several operations. Referring to FIG. 2 with reference to FIG. 1, a control process 200 executable as part of the distributed control system 110 detects suspension of the synchronous disaster recovery link 202. The control process responds to link suspension by suspending the asynchronous disaster recovery link 204 prior to resynchronizing the synchronous disaster recovery link 206 so that data in the third data center is not rendered corrupt and/or unusable for disaster recovery if data is lost in the first and second data centers.

Figure 3:
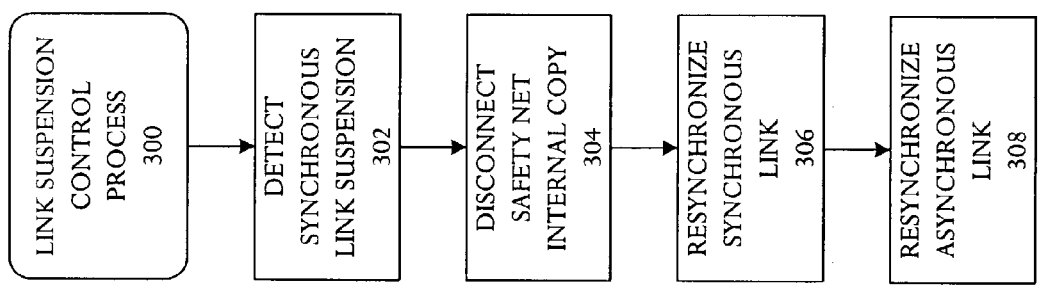
FIG. 3 is a flow chart that shows an embodiment of another control process that can be executed as part of the distributed control system.

Referring to FIG. 3 with reference to FIG. 1, a flow chart shows an embodiment of another control process 300 that can be executed as part of the distributed control system 110. The control process 300 detects suspension of the synchronous communication link 302, and responds by disconnecting 304 the copy data storage 108B from the third data center data storage 106B prior to resynchronizing the synchronous communication link 306 and the asynchronous communication link 308. The copy data storage 108B contains a redundant, safety-net copy of data internal to the third data center 106.

Figure 4:
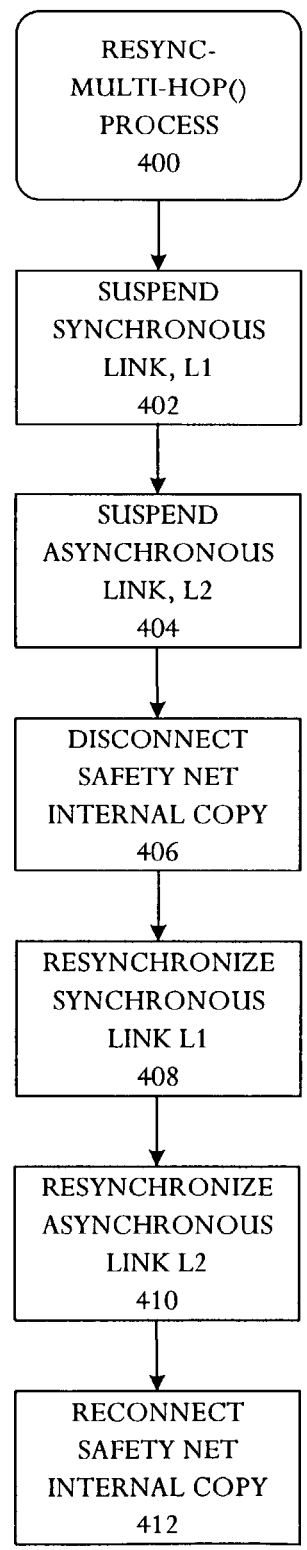
FIG. 4 is a schematic flow chart illustrating an example of a daisy-chained multiple-site disaster recovery process.

Referring to FIG. 4 with reference to FIG. 1, a schematic flow chart shows an example of a daisy-chained multiple-site disaster recovery process 400. In the daisy-chained configuration, a single command can be issued from a device, such as a host computer, such as a Resync-CascadeL1( ) command. The Resync-CascadeL1( ) command invokes the distributed control system 110 to perform a sequence of operations in a prescribed order. In some embodiments, suspension of the asynchronous link occurs in an atomic operation in which the distributed control system 110 controls a system that can suspend or break a communication link in an atomic action. In an atomic action, the reflection of write data to a secondary volume occurs at a specific point in time. After an atomic break, the secondary volume is a valid image of the primary volume. A mirror split or break commonly results from a specific break command, or by a link failure in some systems.

After a mirror split, the distributed control system 110 suspends 404 the inter-site asynchronous link L2. After the asynchronous link L2 is suspended, the distributed control system 110 breaks off or disconnects 406 the third data center safety net internal copy 108B from the third data center primary storage 106B. The distributed control system 110 resynchronizes 408, via an out-of-order COPY state, the synchronous link L1 and then 410 the asynchronous link L2. The distributed control system 110 returns to normal operation by reconnecting 412 the third data center safety-net internal copy 108B to the third data center 106.

In embodiments that an atomic split of aggregated internal copy LUNs is not available, the distributed control system 110 begins the response by suspending 402 the inter-site synchronous link L1.

The distributed control system 110 automates the resynchronization process for the synchronous link L1 to avoid or eliminate user error, and also enables coordinated disconnection or split-off of the safety-net internal volume copy 108B at the third data center 106 prior to the upstream asynchronous link L2 going into an out-of-order resynchronized state.

Figure 5:
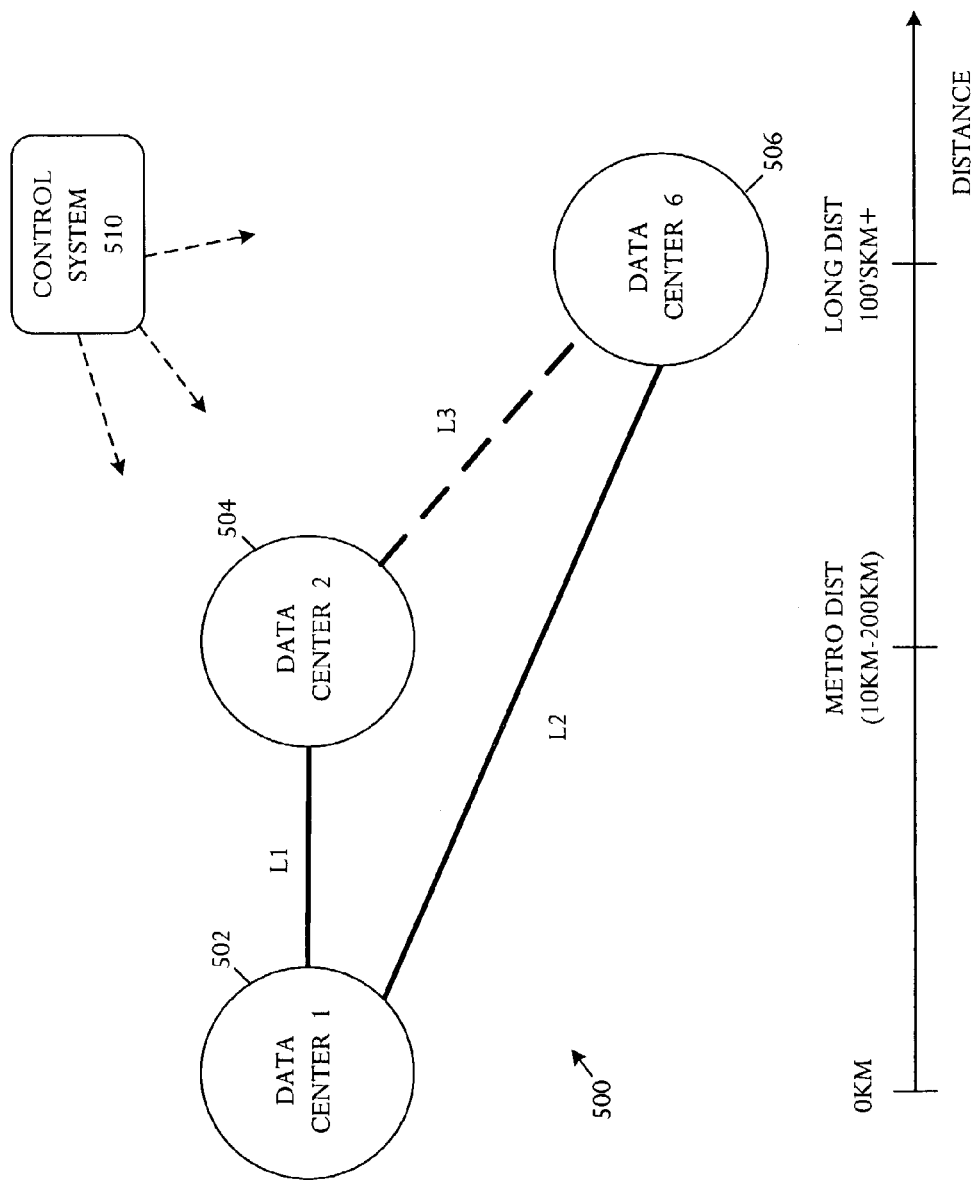
FIG. 5 is a schematic block diagram showing a disaster recovery system that implements sequenced cascaded resynchronization.

Referring to FIG. 5, a schematic block diagram shows a disaster recovery system 500 that implements sequenced multi-cast resynchronization and comprises three or more data centers. The configuration includes a first data center 502, a second data center 504 linked to the first data center by a synchronous communication link L1, and a third data center 506. The third data center 506 is linked to the first data center 502 and the second data center 504 by asynchronous communication links L2 and L3, respectively. The first data center 502 multicasts data to the second 504 and third 506 data centers. The disaster recovery system 500 also includes a distributed control system 510 that is distributed and executable in the data centers. The distributed control system 510 responds to failure of the link L1 between the first 502 and second 504 data centers by transferring a bitmap representing a differential copy of information from the first data center 502 to the second data center 504 via the third data center 506.

In a particular embodiment, the link L1 between the first 502 and second 504 data centers is a synchronous link, and the links L2 and L3 between the third data center 506 and the first 502 and second 504 data centers, respectively, are asynchronous links. Also in some embodiments, the links L1, L2, and L3 are mirror links that transfer mirror image data between data centers.

The distributed control system 510 is distributed either internally or externally to the data centers and executes by coordinated operation to control communication links between the data centers and data stored in the data centers. The distributed control system 110 can be disseminated via the communication links or network communications. The distributed control system 110 can be implemented using various techniques such as Application Programming Interface (API), Meta command, or as a Command Line Interface (CLI).

The distributed control system 110 can include a control process for handling the condition, in a three-site disaster recovery multi-cast system, in which a link L1, for example a metropolitan distance link, between the first data center 502 and the second data center 504 is lost. One technique for restoring data in the second data center 504 is to establish a connection L3 that can be a long distance communication link, from the third data center 506 to the second data center 504 and supplying a copy. In various embodiments, the copy can be a full copy or partial copy. Transfer of a partial copy improves efficiency of the recovery process since time duration of a full copy can be lengthy, during which no valid third disaster recovery site is available.

In some embodiments, the transfer from the first data center 502 to the third data center 506 can be transfer of an asynchronous sidefile bitmap and supplying the bitmap to the second data center 504 via the third data center 506, so that the mirror pair connection between the second 504 and third 506 data centers can be performed with a differential copy. Accordingly, upon failure of the link L1, a data center 2-link L2 bitmap resulting from the asynchronous sidefile is transferred to the third data center 506 that forwards the bitmap to the second data center 504 via link L3. The second data center 504 can use the bitmap to update the third data center 506 via an out-of-order COPY state without the overhead of transferring a full copy, thereby maintaining two current data center sites in a more timely manner.

Figure 6:
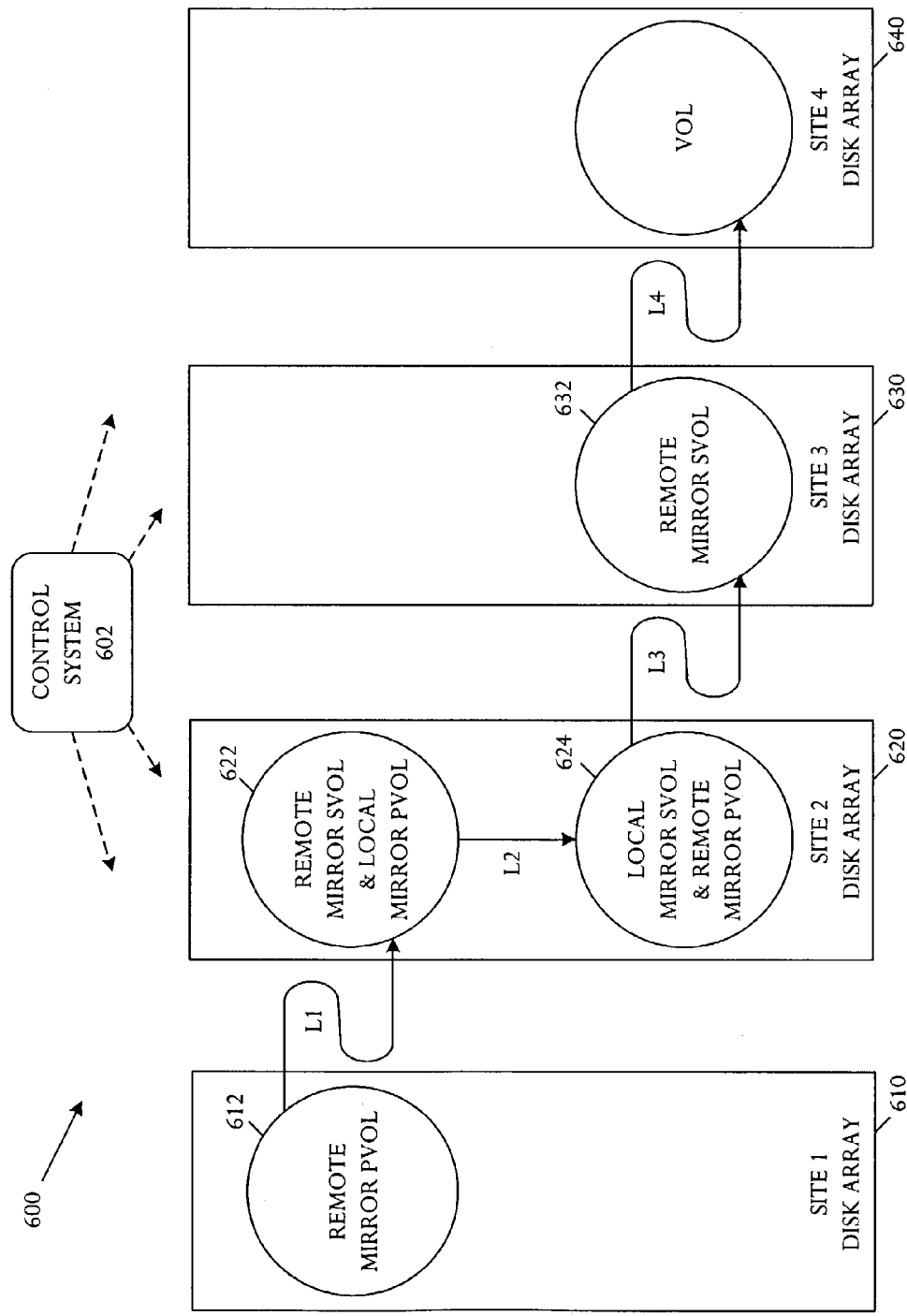
FIG. 6 is a schematic block diagram that depicts an example of a disaster recovery system including sequenced cascaded resynchronization.

Referring to FIG. 6, a schematic block diagram depicts an example of a disaster recovery system 600 including sequenced cascaded resynchronization. The illustrative disaster recovery system 600 comprises four or more disk arrays 610, 620, 630, and 640 in a configuration. The first disk array 610 comprises remote mirror primary volume storage 612. The second disk array 620 comprises a remote mirror secondary volume and local mirror primary volume storage 622 linked to the remote mirror primary volume storage 612 by a first communication link L1. The second disk array 620 also comprises a local mirror secondary volume and remote mirror primary volume storage 624 internally mirror linked to the remote mirror secondary volume and local mirror primary volume storage 622 by a second communication link L2 that is internal to the second disk array 620. The third disk array 630 comprises a remote mirror secondary volume storage 632 linked to the second disk array local mirror secondary volume and remote mirror primary volume storage 624 by a third communication link L3. The fourth disk array 640 is linked to the remote mirror secondary volume storage 632 by a fourth communication link L4. The disaster recovery system 600 further comprises a distributed control system 602 distributed and executable in the disk arrays that coordinates timing of data mirroring to promote consistency of the mirrored copies.

In other embodiments and configurations, the disk arrays may be variously arranged with multiple arrays contained in a single data center and connected by internal links, or arranged separately in data centers that have some degree of geographical remoteness.

A typical difficulty that the disaster recovery system 600 avoids or alleviates is that the interior mirror link L2 can be either inconsistent while in a pair state or stale while in a suspend state if the data mirroring operations are not coordinated.

In some embodiments, the distributed control system 602 controls the communication links and coordinates data mirroring operations using Meta commands.

Figure 7:
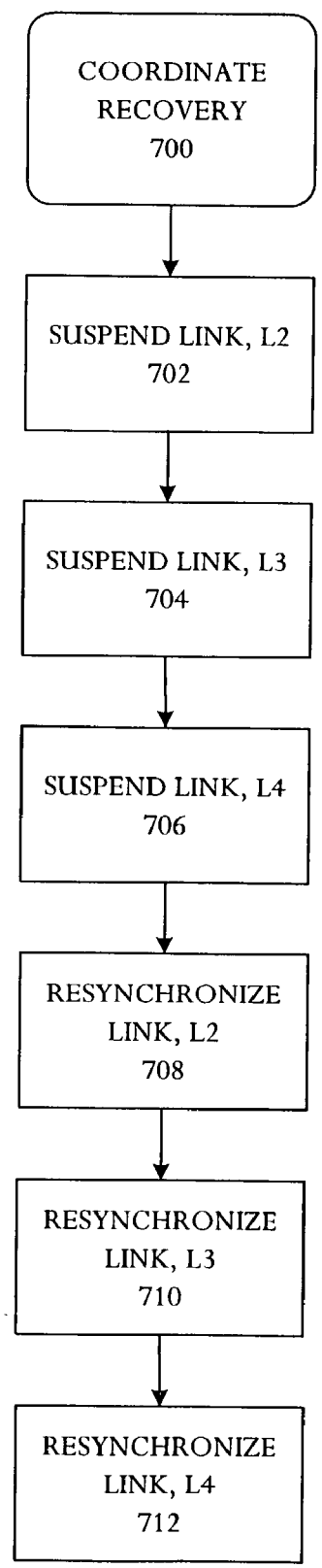
FIGS. 7 and 8 are flow charts that illustrate examples of methods that can be performed by the disaster recovery system to coordinate data handling.

Referring to FIG. 7 in combination with FIG. 6, a flow chart illustrates an example of a method 700 that can be performed by the disaster recovery system 600 to coordinate data handling. For a system that supports atomic LUN group splitting or break breaking of mirrors, a control operation begins by suspending 702 the internal link L2, followed in sequence by suspending 704 and 706 the external links L3 and L4, respectively. The disaster recovery system 600 then, in sequence, resynchronizes the links 708, 710, and 712 in the order link L2, link L3, and link L4.

Figure 8:
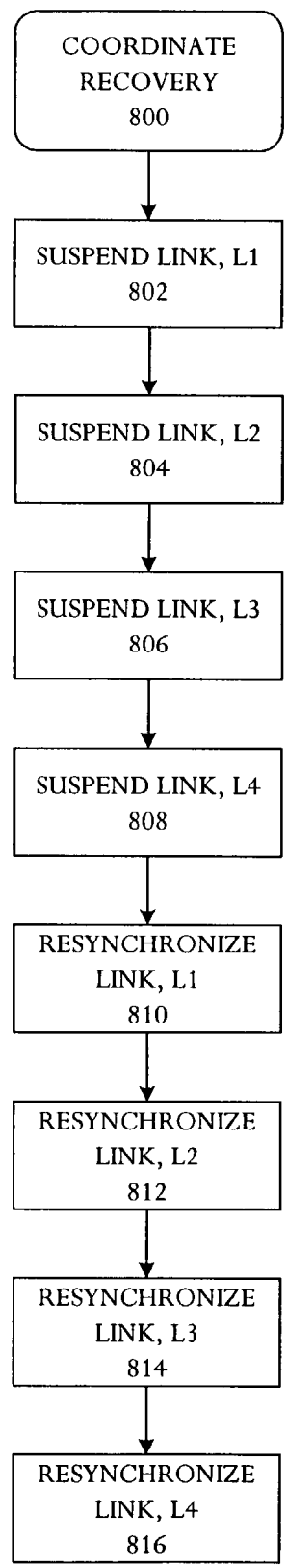

Referring to FIG. 8 in combination with FIG. 6, a flow chart illustrates an example of a method 800 that can be performed by the disaster recovery system 600 to coordinate data handling. For a system that does not support atomic LUN group splitting or breaking of mirrors, a control operation begins by suspending 802 the internal link L1, followed in sequence by suspending 804, 806, and 808 the external links L2, L3, and L4, respectively. The disaster recovery system 600 then, in sequence, resynchronizes 810, 812, 814, and 816 the links in the order link L1, link L2, link L3, and link L4.

Figure 9:
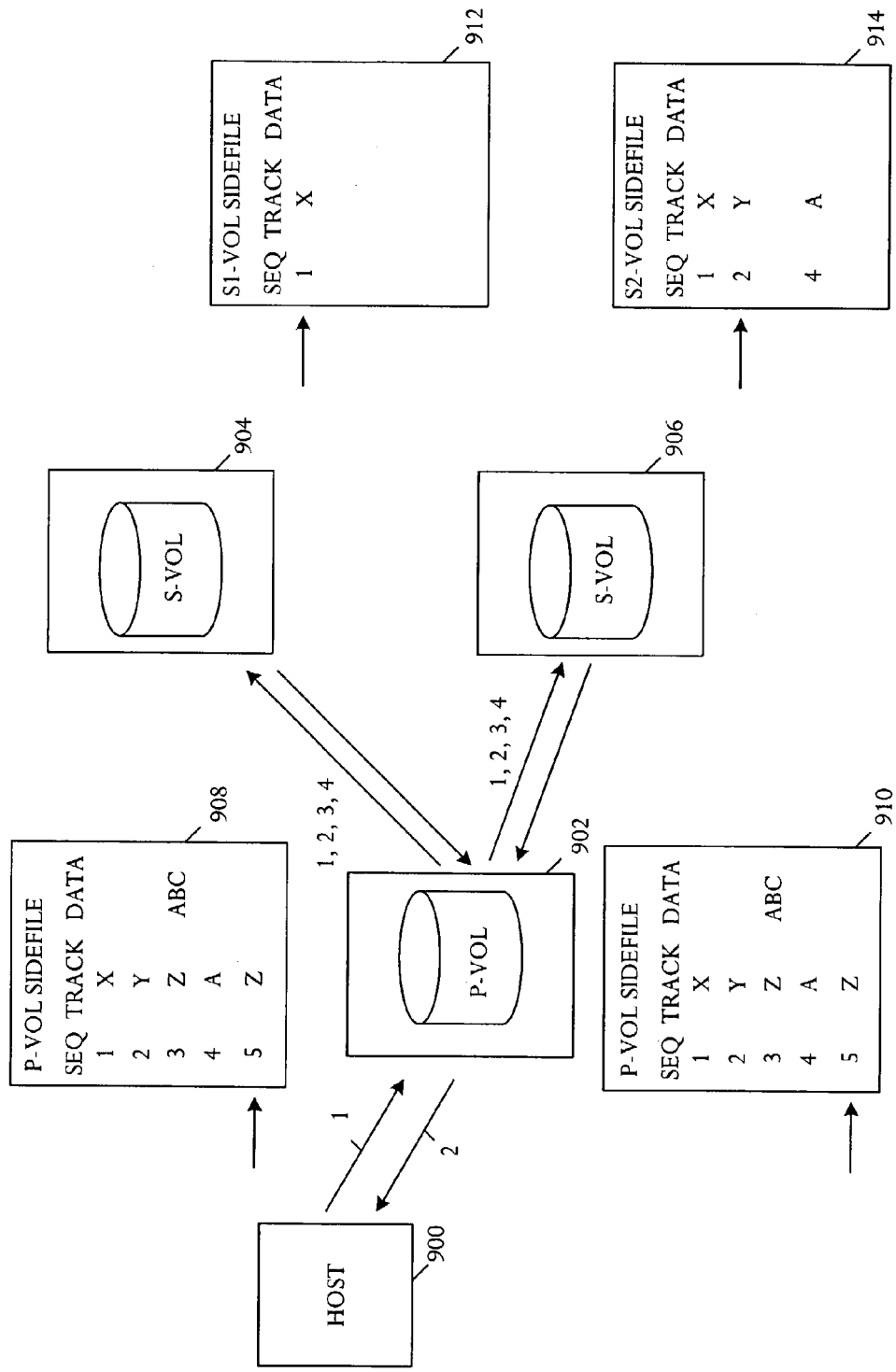
FIG. 9 is a schematic block diagram illustrating sidefile usage in a configuration with a one-to-many relationship between primary and secondary volumes.

Referring to FIG. 9, a schematic block diagram illustrates sidefile usage in a configuration with a one-to-many relationship between primary and secondary volumes. In a particular example, the configuration can be implemented in a design using a Fibre Channel infrastructure. Asynchronous replication uses sequence order tracking of update occurrence to ensure consistency. Tracking takes place in two primary volume sidefiles 908 and 910, and two secondary volume sidefiles 912 and 914. An additional primary volume sidefile is added for each secondary site that is application for asynchronous replication.

Updates are ordered, for example by a host 900, with a sequence number and transmitted to the remote disk volumes 904 and 906. When a remote disk volumes 904, 906 receives the next sequence number in a set, the remote disk volumes 904, 906 acknowledges receipt of the data according to sequence number to the primary disk volume 902 and the affected sequence number is removed from a primary volume sidefile list 908 and 910. If a transaction is lost between the primary volume 902 and one of the secondary volumes 904, 906, then retransmission of a specific sequence number's data can be requested.

The one-to-many configuration can be used for various cascaded configurations.

Figure 10A:
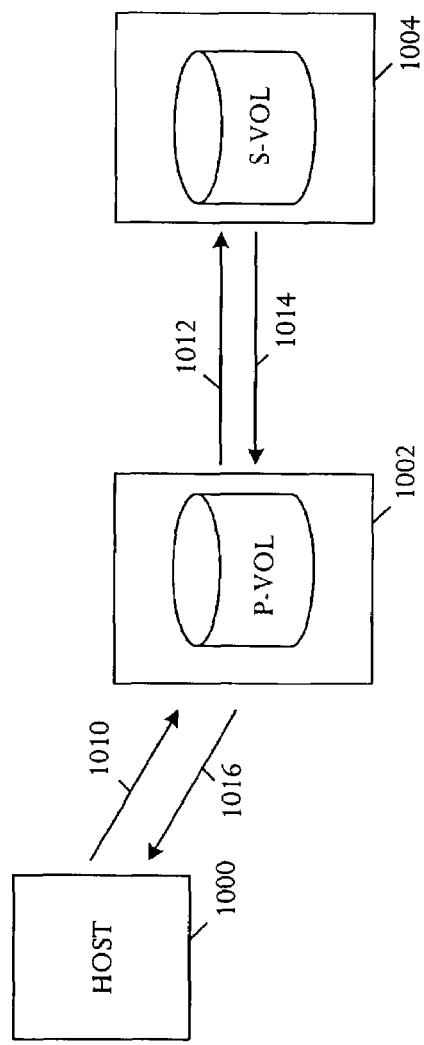
FIGS. 10A and 10B are schematic block diagrams respectively showing synchronous and asynchronous data replication techniques that are compatible with the illustrative method for preserving logical object integrity in a remote mirror cache.

Referring to FIG. 10A, a schematic block diagram illustrates a synchronous data replication method. Any input/output commands 1010 issued to a primary storage array 1002 from a host 1000 are copied 1012 to a secondary storage array 1004. Once data is written in memory on the secondary array 1004, the input/output is acknowledged 1014 to the primary array 1002 and then acknowledged 1016 to the host 1000. In a particular embodiment, a main control unit performs a write operation on a primary volume, starts the update copy operation on the secondary volume, and reports final ending status to a host only after results of the update copy operation are known. If either the primary volume write or the secondary volume update copy operation fails, the main control unit reports a unit check, and the host system and application program regard the write operation to the primary volume as failed. The method for preserving logical object integrity in a remote mirror cache prevents the secondary volume from containing inconsistent or incorrect data.

The illustrative example depicts a two-site data replication and is similarly extended to additional replication sites. In a two-site data replication method, the host application is responsible for data integrity. Because an input/output command is only acknowledged to the application 1016 when written to both arrays 1002 and 1004, the application only issues the next input/output command once the first command is complete so that data is written to the secondary array 1004 in order and consistent. Synchronous replication is relative unsuited to multiple site mirroring since each additional new site adds to the response time of the application.

Figure 10B:
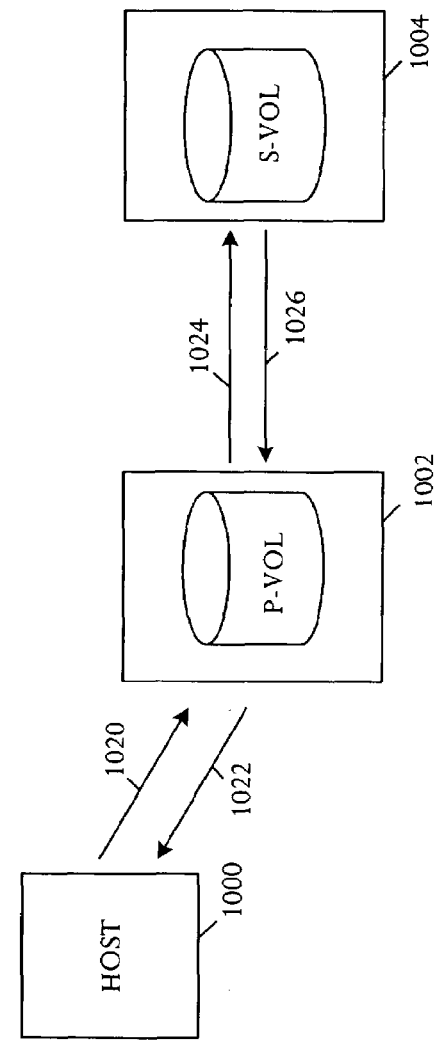

Referring to FIG. 10B, a schematic block diagram depicts an asynchronous data replication method with record ordering. An input/output command issued 1020 by the host 1000 to the primary storage array 1002 is immediately acknowledged 1022 to the host 1000 as soon as the command reaches the cache. A sequence number is added to the input/output command and sent 1024 to the secondary array 1004. Since the path to the secondary array 1004 can traverse any of multiple paths or routes, a possibility exists that the input/output commands can arrive out of order. The secondary array 1004 is responsible for reordering the incoming commands according to sequence number and applying data records in the correct sequence. Management by the secondary array 1004 ensures an in-order, consistent database, although the most current transactions can be lost in the event of a failure. Asynchronous data replication is better suited for long-distance replication since latency impact on the application host is reduced or eliminated.

In a particular example, the main control unit completes primary volume operations independently of the associated update copy operations at the secondary volume. The remote control unit manages the secondary volume updates according to the recordset information and maintains sequence ordered data consistency for the secondary volumes. If the primary volume write operation fails, the main control unit reports a unit check and does not create an asynchronous recordset for the operation. If the update copy operation fails, the remote control unit can optionally suspend either the affected pair or all pairs in a consistency group, depending on the type of failure. At resumption of the suspended pair, the main control unit and remote control unit can negotiate resynchronization of the pairs. The method for preserving logical object integrity in a remote mirror cache prevents an operation from leaving incorrect information on a secondary volume.

Figure 11:
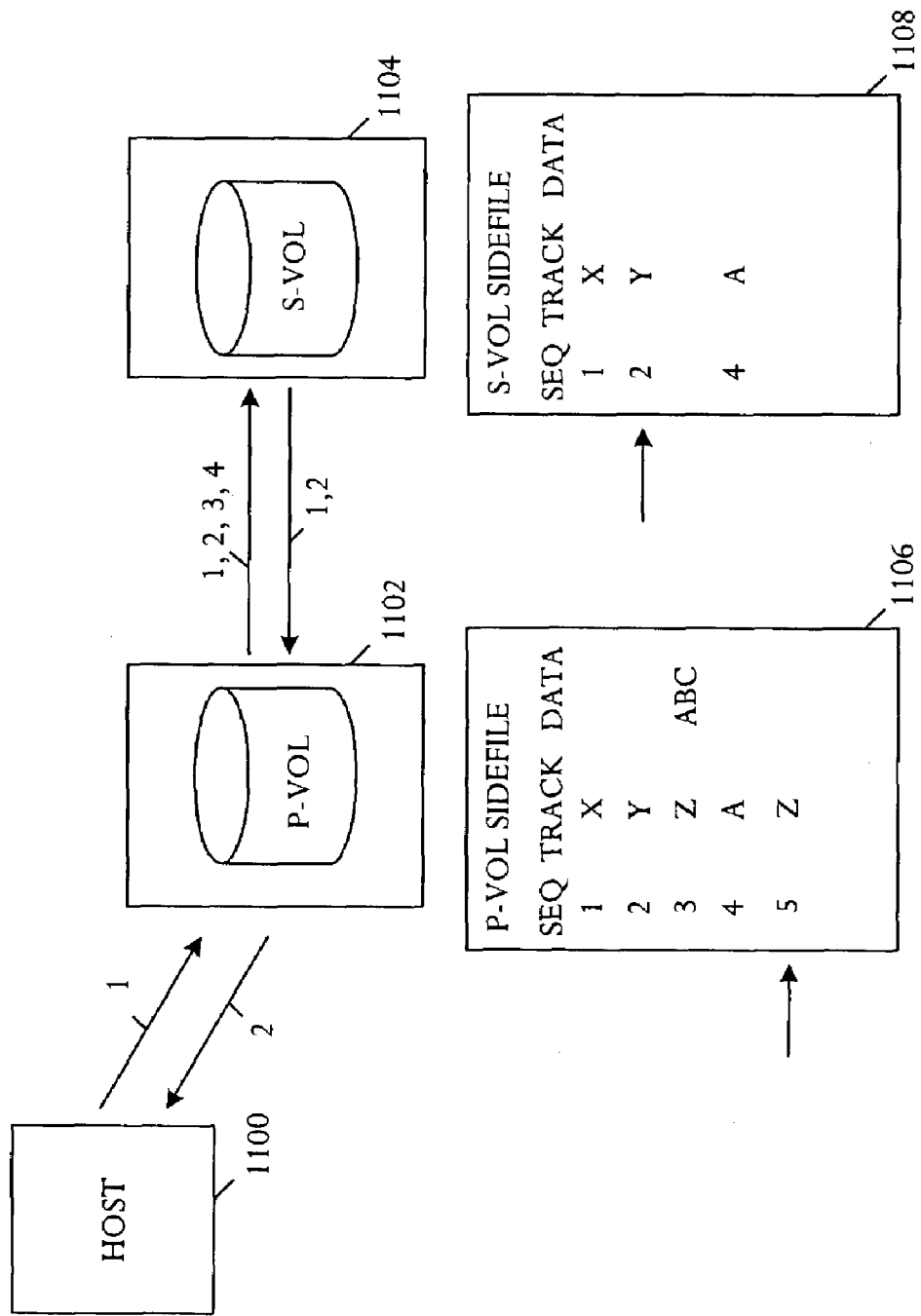
FIG. 11 is a schematic block diagram that illustrates sidefile usage in asynchronous data replication.

Referring to FIG. 11, a schematic block diagram illustrates sidefile usage in asynchronous data replication. Asynchronous replication uses sequence order tracking of update occurrence to ensure consistency. Tracking takes place in a primary volume sidefile 1106 and a secondary volume sidefile 1108. The individual updates are ordered with a sequence number and transmitted to the remote array 1104. When the remote array 1104 has received the next sequence number in the set, the remote array 1104 acknowledges receipt of the data according to sequence number to the primary array 1102 and the affected sequence number is removed from the primary volume sidefile list 1106. If a transaction is lost between the primary array 1102 and the secondary array 1104, retransmit of a specific sequence number's data can be requested.

The sequence of numbers is managed in memory of the primary array 1102 and the remote array 1104 and utilizes additional resources, the sidefiles 1106 and 1108. For an input/output operation performed to the primary array 1102, an entry is added to the sidefile 1106 containing the sequence number and a pointer to the blocks affected by the update. If the same block is updated on a subsequent input/output operation, contents of the block are also recorded in the sidefile 1106. The sidefile size is dependent on performance of the links to the remote array 1104 against the number of input/output operations performed by the primary array 1102. If the sidefile 1106 reaches a predetermined percentage of the total cache memory in the array 1102, for example if the input/output operations are backing up in the cache due to a slow link, the input/output rate from the host 1100 is restricted in an attempt to give higher priority to the sidefile 1106.

A sidefile is typically only used as long as a communication exists between the primary site 1102 and the secondary site 1104. If communication is disrupted, or pairs are suspended, overhead of a sidefile is considered to be too high so a bitmap is instead used to track changes, typically on a per-track or per-cylinder basis.

In various embodiments, the asynchronous recordsets can contain primary volume updates and associated control information, for example sequence number of the primary volume update to enable the remote control unit to maintain update consistency of the secondary volumes. Recordset operations can include creating and storing recordsets at the main control unit, sending recordsets to the remote control unit, storing recordsets in the remote control unit, and selecting and settling recordsets at the remote control unit. Other operations include controlling inflow for sidefiles.

In one example, upon a host-requested write input/output operation the main control unit performs an update and creates a recordset. The recordset can include the updated record, sequence number, record location such as device, cylinder, track, and record number, and record length. The recordsets can be queued in cache storage of the main control unit and sent to the remote control unit independent of host input/output processes. The remote control unit uses the sequence number in the recordsets to update the secondary volumes in the order of the primary volumes. The sequence number indicates the number of recordsets that the main control unit has created for each consistency group. Recordset information, other than updated records, is stored and queued in an area of cache known as sidefile cache.

In the example, the main control unit can send recordsets to the remote control unit by using main control unit initiator ports for issuing special input/output operations, called remote I/Os, to the remote control unit. The remote I/Os transfer recordsets efficiently using a single channel command so that the main control unit can send multiple recordsets in a single remote I/O call, even with noncontiguous sequence numbers. The remote control unit can store recordsets, maintaining queues to control storing of recordsets in the sidefile and commitment of updating records in the secondary volumes. Remote control unit queuing can use the sequence numbers to check for missing updates.

A bitmap table is an efficient technique to track changed records on a device from a particular point in time. Bit map tables record the changed track or cylinder number and typically do not maintain information concerning sequence or details of changes. During times of no communication between the primary site 1102 and secondary site 1104 or the pairs are suspended, a delta bit map table is maintained on both the primary 1102 and secondary 1104 arrays. Upon resynchronization of the pairs, only the changed cylinders are copied to the remote array 1104, bringing the data mirror up to date. Thereafter, a sidefile is again used to continue updates. During resynchronization, data on the remote array 1104 is inconsistent and unreliable.

Tracking of consistency groups is used to assure correct operation. An asynchronous consistency group is a user-defined set of volume pairs across which update sequence consistency is maintained and ensured at the remote site. Each asynchronous volume pair is assigned to a consistency group. In an illustrative system, the database system allows configuration of a predetermined number of consistency groups for each main control unit and supports group-based operations for the consistency groups. Consistency groups enable maintenance of update sequence consistency for databases that span multiple volumes, facilitating immediate database recovery at the remote site in the event of a failure or disaster.

An application commonly includes an aggregation of more than one physical device. Accordingly, correct operation can depend on assurance that all input/output activities are consistently applied to remote devices. During asynchronous operations, all devices in a device group form the same consistency group. Sequence numbers in a sidefile are issued at the consistency group granularity level so that input/output operations applied to the primary devices of that consistency group are applied to the secondary devices in the same sequence. If a device in the consistency group is not applied to be updated, the entire consistency group is placed into an error state. Consistency groups are defined and controlled so that writes to all devices in the consistency group are not destaged unless all are ready. Consistency is applied to all devices in the consistency group, not simply a single LUN.

The method for preserving logical object integrity in a remote mirror cache can be used in the various remote copy operations of the database system, such as initial copy and update copy operations. An initial copy operation synchronizes the primary volumes and secondary volumes, generally independently of host processes. The initial copy typically takes place when a user adds a volume pair or resumes a split or suspended volume pair. When a new pair is created, the entire contents of the primary volume are copied to the secondary volume cylinder by cylinder, except for diagnostic and unassigned alternate tracks. Various database system embodiments may implement or omit usage of the method for preserving logical object integrity in a remote mirror cache for initial copy. Because initial copy generally occurs for more controlled conditions of database usage, some database system embodiments may omit the overhead associated with the method for preserving logical object integrity in a remote mirror cache for initial copy.

An update copy operation occurs when a host issues a write input/output operation to a primary volume of an established volume pair. The update copy operation duplicates the primary volume write input/output operation at the secondary volume to maintain volume pair synchrony. Usage of the method for preserving logical object integrity in a remote mirror cache is useful in update copying to assure correct database operations.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the disclosed apparatus and technique can be used in any database configuration with any appropriate number of storage elements. Although, the database system discloses magnetic disk storage elements, any appropriate type of storage technology may be implemented. The system can be implemented with various operating systems and database systems. The control elements may be implemented as software or firmware on general purpose computer systems, workstations, servers, and the like, but may be otherwise implemented on special-purpose devices and embedded systems.

What is claimed is:

1. A disaster recovery system with sequenced cascaded resynchronization comprising:
    a plurality of data centers, the individual data centers comprising a communication interface, a data storage, and a controller;
    a distributed control system distributed and executable in the controllers of the plurality of data centers, and capable of coordinating operations via the communication interfaces of the plurality of data centers to resynchronize a plurality of communication links between data center pairs of the plurality of data centers, the communication links including at least one synchronous link and at least one asynchronous link;
    a synchronous disaster recovery link that feeds an asynchronous disaster recovery link in a cascaded disaster recovery configuration; and
    a control process executable on the distributed control system that responds to suspension of the synchronous disaster recovery link by suspending the asynchronous disaster recovery link prior to resynchronizing the synchronous disaster recovery link.

2. A disaster recovery system with sequenced cascaded resynchronization comprising:
    a plurality of data centers, the individual data centers comprising a communication interface, a data storage, and a controller, the plurality of data centers further comprising:
    a first data center;
    a second data center coupled to the first data center by a synchronous communication link; and
    a third data center coupled to the second data center by an asynchronous communication link, the third data center comprising a first data storage, a second data storage, and a copy controller capable of controlling the second data storage to store a copy of information stored in the first data storage;
    a distributed control system distributed and executable in the controllers of the plurality of data centers, and capable of coordinating operations via the communication interfaces of the plurality of data centers to resynchronize a plurality of communication links between data center pairs of the plurality of data centers, the communication links including at least one synchronous link and at least one asynchronous link;
    a synchronous disaster recovery link between the first data center and the second data center that feeds an asynchronous disaster recovery link between the second data center and the third data center in a cascaded disaster recovery configuration; and
    a control process executable on the distributed control system that responds to suspension of the synchronous disaster recovery link by suspending the asynchronous disaster recovery link prior to resynchronizing the synchronous disaster recovery link so that data in the third data center is not rendered corrupt and/or unusable for disaster recovery if data is lost in the first and second data centers.

3. A disaster recovery system with sequenced cascaded resynchronization comprising:
    a plurality of data centers, the individual data centers comprising a communication interface, a data storage, and a controller, the plurality of data centers further comprising:
    a first data center;
    a second data center coupled to the first data center by a synchronous communication link; and
    a third data center coupled to the second data center by an asynchronous communication link, the third data center comprising a first data storage, a second data storage, and a copy controller capable of controlling the second data storage to store a copy of information stored in the first data storage;
    a distributed control system distributed and executable in the controllers of the plurality of data centers, and capable of coordinating operations via the communication interfaces of the plurality of data centers to resynchronize a plurality of communication links between data center pairs of the plurality of data centers, the communication links including at least one synchronous link and at least one asynchronous link; and a control process executable in the distributed control system that responds to suspension of the synchronous communication link by disconnecting the third data center second data storage information from the first data storage information prior to resynchronizing the synchronous and asynchronous communication links.

4. A disaster recovery system with sequenced cascaded resynchronization comprising:

a plurality of data centers, the individual data centers comprising a communication interface, a data storage, and a controller, the plurality of data centers further comprising:
a first data center;
a second data center coupled to the first data center by a synchronous communication link; and
a third data center coupled to the second data center by an asynchronous communication link, the third data center comprising a first data storage, a second data storage, and a copy controller capable of controlling the second data storage to store a copy of information stored in the first data storage;

a distributed control system distributed and executable in the controllers of the plurality of data centers, and capable of coordinating operations via the communication interfaces of the plurality of data centers to resynchronize a plurality of communication links between data center pairs of the plurality of data centers, the communication links including at least one synchronous link and at least one asynchronous link; and a control process executable in the distributed control system that responds to a failure condition comprising:
a first subprocess that suspends the asynchronous link;
a second subprocess activated after the first subprocess that disconnects the third data center second data storage information from the first data storage information;
a third subprocess activated after the second subprocess that resynchronizes the synchronous link between the first data center and the second data center;
a fourth subprocess activated after the third subprocess that resynchronizes the asynchronous link between the second data center and the third data center; and
a fifth subprocess activated after the fourth subprocess that reconnects the third data center second data storage information from the first data storage information.

5. The disaster recovery system according to claim 4 further comprising:
a control process executable in the distributed control system that responds to a failure condition comprising:
a sixth subprocess activated prior to the first subprocess that suspends the synchronous link.

6. The disaster recovery system according to claim 4 wherein:
the control process executes in by coordinated operation in the controllers of the plurality of data centers via synchronous and asynchronous link communications.

7. The disaster recovery system according to claim 4 wherein:
the control process executes in by coordinated operation in the controllers of the plurality of data centers via network communications.

8. The disaster recovery system according to claim 4 wherein:
the control process in implemented as an Application Programming Interface (API).

9. The disaster recovery system according to claim 4 wherein:
the control process in implemented as a Command Line Interface (CLI).

10. The disaster recovery system according to claim 3 wherein:
the plurality of data centers include data centers that are geographically removed so that the synchronous link is a metro distance of tens of kilometers up to 200 kilometers, and the asynchronous link is a long distance of more than hundreds of kilometers.

11. A disaster recovery system with sequenced cascaded resynchronization comprising:
at least three data centers in a configuration including:
a first data center;
a second data center linked to the first data center by a communication link; and
a third data center linked to the first data center and the second data center by communication links, information being multicast at least from the first data center to the second and third data centers; and
a distributed control system distributed and executable in the at least three data centers, the distributed control system being configured to respond to failure of the link between the first and second data centers by transferring a bitmap representing a differential copy of information from the first data center to the second data center via the third data center.

12. The disaster recovery system according to claim 11 wherein:
the communication links between the data centers are mirror links.

13. The disaster recovery system according to claim 11 wherein:
the communication link between the first and second data centers is a synchronous link; and
the communication links between the first and third data centers and between the second and third data centers are asynchronous links.

14. A disaster recovery system with sequenced cascaded resynchronization comprising:
at least three data centers in a configuration including:
a first data center;
a second data center linked to the first data center by a communication link; and
a third data center linked to the first data center and the second data center by communication links, information being multicast at least from the first data center to the second and third data centers;
a distributed control system distributed and executable in the at least three data centers, the distributed control system being configured to respond to failure of the link between the first and second data centers by transferring a bitmap representing a differential copy of information from the first data center to the second data center via the third data center; and
at least one memory associated with the at least three data centers, the at least one memory being capable of storing an asynchronous sidefile bitmap, the distributed control system being responsive to the link failure between the first and second data centers by transferring an asynchronous sidefile bitmap from the first data center to the second data center via the third data center, the second data center being capable of using the asynchronous sidefile bitmap to update information in the third data center in a differential update.

15. The disaster recovery system according to claim 11 wherein:
the distributed control system executes in by coordinated operation in the at least three data centers via the communication links or network communications.

16. The disaster recovery system according to claim 11 wherein:
the distributed control system is implemented as an Application Programming Interface (API) or as a Command Line Interface (CLI).

17. A method of responding to failure of a link in a daisy-chained multiple-site disaster recovery configuration including a first data center, a second data center synchronously linked to the first data center, and a third data center asynchronously linked to the second data center, the third data center having an internal copy linkage, the method comprising:
distributing control operations among the first, second, and third data centers;
coordinating control among the first, second, and third data centers;
suspending the asynchronous linkage between the second and third data centers;
disconnecting the internal copy linkage of the third data center when the asynchronous linkage is suspended;
resynchronizing the synchronous linkage between the first and second data centers following disconnection of the internal copy linkage;
resynchronizing the asynchronous linkage between the second and third data centers following resynchronization of the synchronous linkage; and
reconnecting the internal copy linkage when the synchronous and asynchronous linkages are resynchronized.

18. The method according to claim 17 further comprising:
suspending the synchronous linkage between the second and third data centers prior to suspending the asynchronous linkage.

19. The method according to claim 17 further comprising:
resynchronizing the synchronous and asynchronous linkages using an out-of-order copy operation.

20. The method according to claim 17 further comprising:
controlling the first, second, and third data centers using an Application Programming Interface (API) or a Command Line Interface (CLI).

21. A method of sequenced cascaded resynchronization comprising:
communicating data and control information among at least three data centers;
multicasting from a first data center to second and third data centers;
distributing control operations among the first, second, and third data centers; and
responding to failure of the link between the first and second data centers by transferring a differential copy of information from the second data center to the third data center, based on a differential bitmap copied from the first data center to the second data center via the third data center.

22. The method according to claim 21 wherein:
the bitmap contains information relating to the unsent Logical Unit (LUN) tracks in an in-order side file previously used for asynchronous communications between the first and third data centers.

23. The method according to claim 21 further comprising:
mirroring data between the data centers.

24. The method according to claim 21 further comprising:
communicating data between the first and second data centers using a synchronous link; and
communicating data between the second and third data centers using an asynchronous link.

25. The method according to claim 21 further comprising:
storing control information in an asynchronous sidefile bitmap in at least one memory associated with the at least three data centers;
responding to the link failure between the first and second data centers by transferring an asynchronous sidefile bitmap from the first data center to the second data center via the third data center; and
using the asynchronous sidefile bitmap in the second data center to update information in the third data center in a differential update.

26. The method according to claim 21 further comprising:
coordinating operation in the at least three data centers via the communication links or network communications.

27. The method according to claim 21 further comprising:
controlling the first, second, and third data centers using an Application Programming Interface (API) or a Command Line Interface (CLI).

28. A disaster recovery system with sequenced cascaded resynchronization comprising:
at least four disk arrays in a configuration including:
a first disk array including a remote mirror primary volume storage;
a second disk array including a remote mirror secondary volume and local mirror primary volume storage linked to the remote mirror primary volume storage by a first communication link, the second disk array also including a local mirror secondary volume and remote mirror primary volume storage internally mirror linked to a remote mirror secondary volume and local mirror primary volume storage by a second communication link; and
a third disk array including a remote mirror secondary volume storage linked to the second disk array local mirror secondary volume and remote mirror primary volume storage by a third communication link; and
a fourth disk array linked to the remote mirror secondary volume storage by a fourth communication link;
a distributed control system distributed and executable in the at least four disk arrays, the distributed control system coordinating timing of data mirroring to promote consistency of the mirrored copies;
the first through fourth communication links comprising a synchronous disaster recovery link that feeds an asynchronous disaster recovery link in a cascaded disaster recovery configuration; and
a control process executable on the distributed control system that responds to suspension of the synchronous disaster recovery link by suspending the asynchronous disaster recovery link prior to resynchronizing the synchronous disaster recovery link.

29. The disaster recovery system according to claim 28 wherein the distributed control system further comprises:
a control process in the distributed control system that controls the communication links using Meta commands.

30. The disaster recovery system according to claim 28 wherein the distributed control system further comprises:
a process capable of suspending the first communication link;

a process capable of suspending the second communication link after the first communication link is suspended;
a process capable of suspending the third communication link after the second communication link is suspended;
a process capable of suspending the fourth communication link after the third communication link is suspended;
a process capable of resynchronizing the first communication link after the fourth communication link is suspended;
a process capable of resynchronizing the second communication link after the first communication link is resynchronized;
a process capable of resynchronizing the third communication link after the second communication link is resynchronized;
a process capable of resynchronizing the fourth communication link after the third communication link is resynchronized.

31. The disaster recovery system according to claim 28 wherein the distributed control system further comprises:
a process capable of suspending the second communication link after an atomic breakage of the first communication link;
a process capable of suspending the third communication link after the second communication link is suspended;
a process capable of suspending the fourth communication link after the third communication link is suspended;
a process capable of resynchronizing the first communication link after the fourth communication link is suspended;
a process capable of resynchronizing the second communication link after the first communication link is resynchronized;
a process capable of resynchronizing the third communication link after the second communication link is resynchronized;
a process capable of resynchronizing the fourth communication link after the third communication link is resynchronized.

32. The disaster recovery system according to claim 28 further comprising:
a one-to-many linkage between primary and secondary volumes using volume sidefile bit maps.

33. An article of manufacture comprising:
a controller usable medium having a computable readable program code embodied therein for responding to failure of a link in a daisy-chained multiple-site disaster recovery configuration including a first data center, a second data center synchronously linked to the first data center, and a third data center asynchronously linked to the second data center, the third data center having an internal copy linkage, the computable readable program code further comprising:
a code capable of causing the controller to distribute control operations among the first, second, and third data centers;
a code capable of causing the controller to coordinate control among the first, second, and third data centers;
a code capable of causing the controller to suspend the asynchronous linkage between the second and third data centers;
a code capable of causing the controller to disconnect the internal copy linkage of the third data center when the asynchronous linkage is suspended;
a code capable of causing the controller to resynchronize the synchronous linkage between the first and second data centers following disconnection of the internal copy linkage;
a code capable of causing the controller to resynchronize the asynchronous linkage between the second and third data centers following resynchronization of the synchronous linkage; and
a code capable of causing the controller to reconnect the internal copy linkage when the synchronous and asynchronous linkages are resynchronized.

34. An article of manufacture comprising:
a controller usable medium having a computable readable program code embodied therein for sequenced cascaded resynchronization, the computable readable program code further comprising:
a code capable of causing the controller to communicate data and control information among at least three data centers;
a code capable of causing the controller to multicast from a first data center to second and third data centers;
a code capable of causing the controller to distribute control operations among the first, second, and third data centers; and
a code capable of causing the controller to respond to failure of the link between the first and second data centers by transferring a bitmap representing a differential copy of information from the first data center to the second data center via the third data center.

35. The article of manufacture according to claim 34 further comprising:
the computable readable program code further comprising:
a code adapted to cause the controller to store an asynchronous sidefile bitmap;
a code adapted to cause the controller to respond to the link failure between the first and second data centers by transferring an asynchronous sidefile bitmap from the first data center to the second data center via the third data center;
a code adapted to cause the controller to use the asynchronous sidefile bitmap to update information in the third data center in a differential update.

* * * * *

UNITED STATES PATENT AND TRADEMARK OFFICE
CERTIFICATE OF CORRECTION

PATENT NO. : 7,149,919 B2  Page 1 of 1
APPLICATION NO. : 10/440209
DATED : December 12, 2006
INVENTOR(S) : Robert Alan Cochran et al.

It is certified that error appears in the above-identified patent and that said Letters Patent is hereby corrected as shown below:

In column 14, line 3, in Claim 8, delete "in" and insert -- is --, therefor.

In column 14, line 7, in Claim 9, delete "in" and insert -- is --, therefor.

Signed and Sealed this

Twenty-seventh Day of July, 2010

David J. Kappos
*Director of the United States Patent and Trademark Office*